(12) United States Patent
Martin et al.

(10) Patent No.: US 7,571,428 B2
(45) Date of Patent: Aug. 4, 2009

(54) RELIABILITY CONTRACTS

(75) Inventors: Rudi Martin, Redmond, WA (US); Mahesh Prakriya, Redmond, WA (US); Brian M. Grunkemeyer, Issaquah, WA (US); Christopher W. Brumme, Mercer Island, WA (US); Sean E. Trowbridge, Sammamish, WA (US); Weiwen Liu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 10/845,679

(22) Filed: May 14, 2004

(65) Prior Publication Data

US 2005/0273764 A1    Dec. 8, 2005

(51) Int. Cl.
G06F 9/45    (2006.01)

(52) U.S. Cl. ...................................................... 717/126
(58) Field of Classification Search ................. 717/126, 717/130, 178; 713/200
See application file for complete search history.

(56) References Cited

U.S. PATENT DOCUMENTS

| 6,295,645 | B1* | 9/2001 | Brewer ........................ 717/178 |
| 6,760,903 | B1* | 7/2004 | Morshed et al. ............. 717/130 |
| 7,120,902 | B2* | 10/2006 | Flanagan et al. ............ 717/130 |
| 2003/0135844 | A1* | 7/2003 | Yellin et al. .................. 717/126 |
| 2004/0250105 | A1* | 12/2004 | Molnar ........................ 713/200 |

\* cited by examiner

Primary Examiner—John Chavis
(74) Attorney, Agent, or Firm—Lee & Hayes, PLLC

(57) ABSTRACT

Reliability contracts declare an intent of executable code, and may be associated with at least a portion of the executable code. The intent of the executable code in the face of particular conditions may be declared for the use in any one of a programming, execution, or testing environment.

8 Claims, 4 Drawing Sheets

RELIABILITY CONTRACTS

FIELD

The present invention is directed towards providing reliability contracts between calling and called methods.

BACKGROUND

Code developers are charged with the daunting task of authoring reliable code that is state-consistent in the face of exceptional conditions. State-consistent code refers to code that is deterministic, i.e., keeps track of the executed process. Exceptional conditions refer to asynchronous executions such as thread abort conditions, out-of-memory conditions, and stack overflow conditions. These conditions are asynchronous in the sense that they are not typically expected in the normal execution of the authored code, and are typically injected by the runtime environment of the code.

The process of authoring reliable code is made even more difficult when the authored code (i.e., "calling method") includes any dependency upon code (i.e., "called method") that originates from another source. If the called method is to be used by the author of the calling method in a reliable context, then the author of the calling method desires knowledge of any guarantees the author of the called method has made regarding how the called method behaves in the face of the aforementioned exceptional conditions. Without any such guarantees, the author of the calling method is unable to make any such guarantees about the reliability of the calling method since no such guarantees have been made with regard to the called method.

Typically, the author of a calling method relies on product documentation to discover any guarantees that have been made with regard to the called method. However, reliance upon product documentation is insufficient if the goal is to author truly reliable code. For example, product documentation is rarely accurate in view of any loss in communication or cooperation between those who author code and those who document the authored code.

SUMMARY

Reliability contracts are described herein.

In order to declare an intent of executable code, reliability contracts may be associated with at least a portion of the executable code. The intent of the executable code in the face of particular conditions may be declared for the purpose of, e.g., accurately programming, executing, or testing the executable code or a calling method.

BRIEF DESCRIPTION OF THE DRAWINGS

The detailed description is described with reference to the accompanying figures.

DETAILED DESCRIPTION

The following description is directed to techniques for providing a reliability contract between a method and its callers. More particularly, a reliability contract provides a statement of reliability for an associated portion of executable code with regard to possible state corruption.

Figure 1:
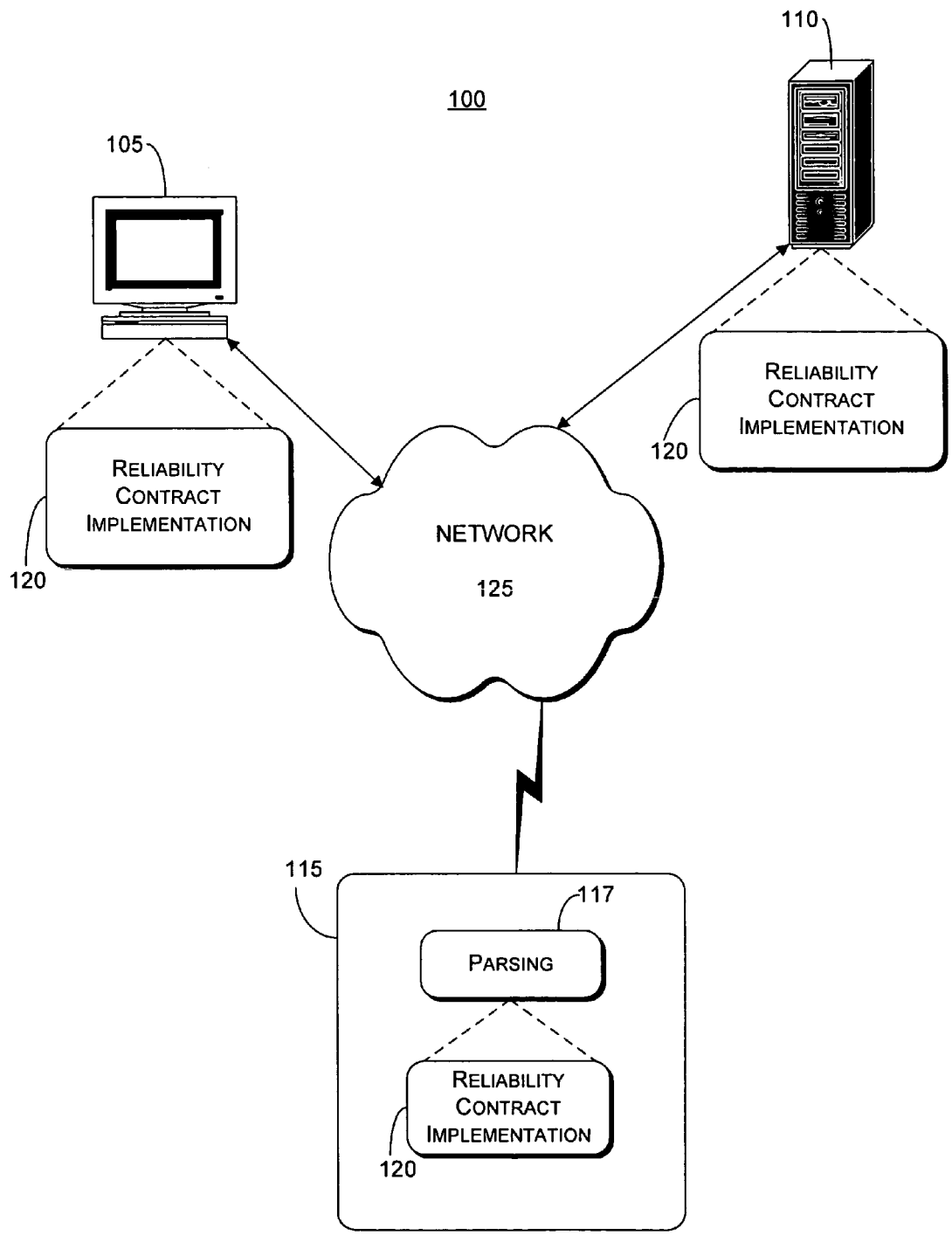
FIG. 1 shows a network environment in which example embodiments of reliability contracts may be implemented.

FIG. 1 shows client device 105, server device 110, and "other" device 115, which are all capable of at least one aspect of reliability contract implementation 120 in accordance with the example embodiments described herein. Client device 105, server device 110, and "other" device 115 may be communicatively coupled through network 120.

Client device 105 may include any of a variety of conventional computing devices, including a desktop personal computer (PC), workstation, mainframe computer, Internet appliance, and gaming console. Further, client device 115 may be any device capable of being associated with network 125 by a wired and/or wireless link, including a personal digital assistant (PDA), laptop computer, cellular telephone, etc. Further still, client device 105 may include the client devices described above in various quantities and/or combinations thereof. Other device 115 may also be embodied by any of the above examples of client device 105. An example embodiment of client device 105 is also described in further detail below with reference to FIG. 4.

Server device 110 may provide any of a variety of data and/or functionality to client device 105. The data may be publicly available or alternatively restricted, e.g., restricted to only certain users or available only if an appropriate fee is paid. Server device 110 is at least one of a network server, an application server, a web blade, or any combination thereof. Typically, server device 110 includes any device that is the source of content, and client device 105 includes any device that receives such content either via network 125 or in an off-line manner. However, according to the example embodiments described herein, server device 105 and client device 110 may interchangeably be a sending host or receiving host. "Other" device 115 may also be embodied by any of the above examples of server device 110. An example embodiment of server device 110 is described in further detail below with reference to FIG. 4.

"Other" device 115 may further be any device that is capable of parsing 117 any portion of an application, program, or function in accordance with various aspects of reliability contract implementation 120. That is, "other" device 115 may be any software-enabled computing or processing device that is capable of analyzing the executable instructions corresponding to an application, program, or function, in any one of a programming environment, a runtime environment, or a testing environment. Thus, "other" device 115 may be any computing or processing device having an interpreter, converter, compiler, operating system, Java® Virtual Machine (JVM), or Common Language Runtime (CLR), implemented thereon. These examples are not intended to be limiting in any way, and should not be construed in that manner.

Network 125 represents any of a variety of conventional network topologies, which may include any wired and/or wireless network. Network 125 may further utilize any of a variety of conventional network protocols, including public and/or proprietary protocols. For example, network 125 may include the Internet, an intranet, or at least portions of one or more local area networks (LANs).

Figure 2:
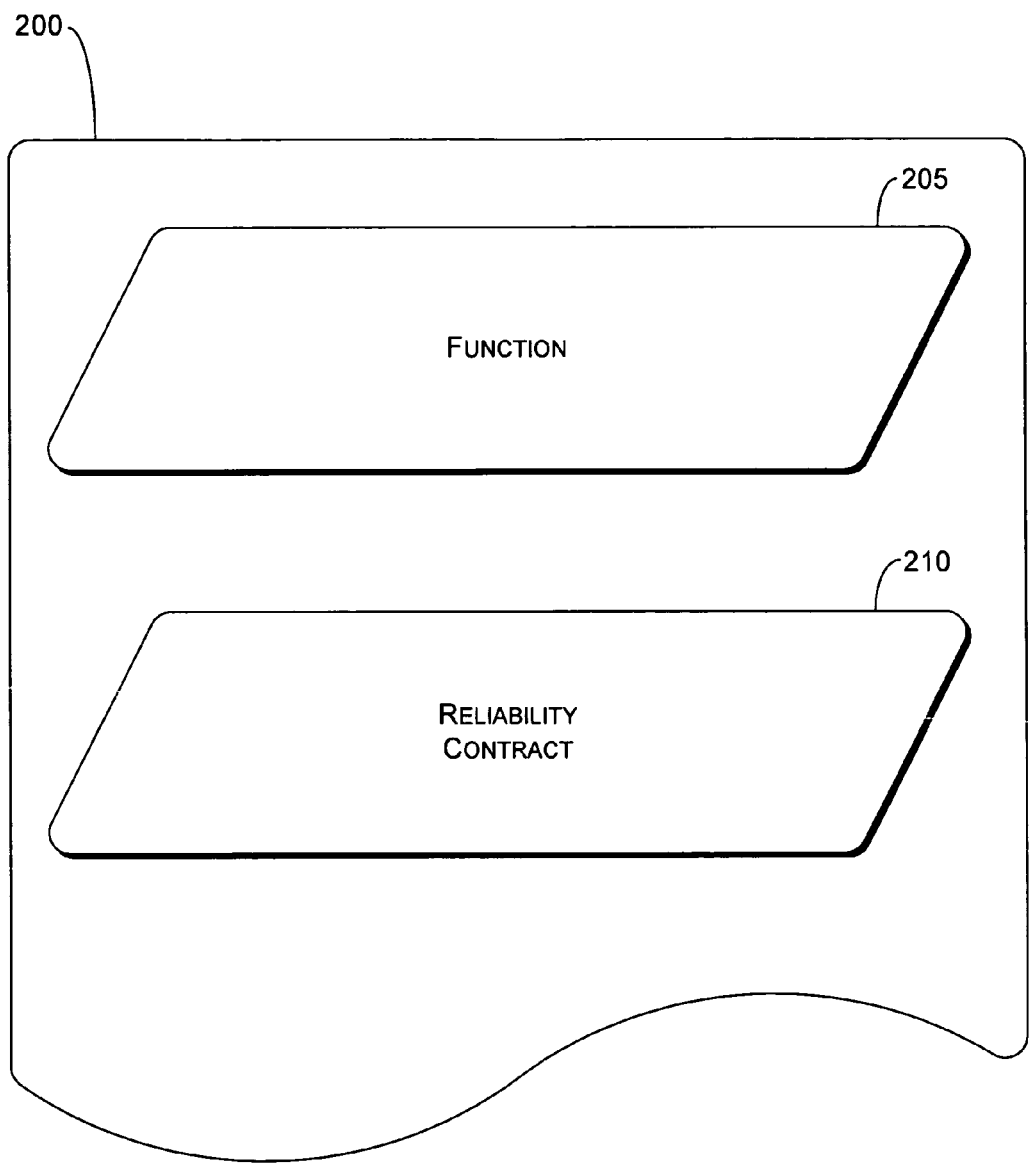
FIG. 2 shows an example embodiment of a document having a reliability contract associated with a method.

FIG. 2 shows an example of application 200 having function 205 and at least one associated reliability contract 210. In this description, application 200 refers to any application, program, set of instructions, method, function, or executable code capable of being written, executed, or tested at any one of client device 105, server device 110, or "other" device 115 (see FIG. 1).

Function 205 refers to any executable portion of application 200. Therefore, function 205 may be any one of an application, program, set of instructions, method, function, or executable code that make up application 200 in part or in its entirety.

Reliability contract 210 is an annotation or other form of semantic information that describes or expresses the intent of function 205 with regard to possible state corruption under particular conditions that are not typically expected during normal execution of function 205. These particular conditions may include, but are in no way intended to be limited to, a thread abort condition, an out-of-memory condition, or a stack overflow condition.

A thread abort condition is a call to abort the thread upon which function 205 is executed. The motivations for a thread abort are numerous, and do not need to be articulated for understanding of the present embodiment. An out-of-memory condition results when too much hardware memory or virtual memory is being used or a sufficiently large contiguous block of memory cannot be allocated, and therefore insufficient resources are available for executing function 205. A stack overflow condition results when insufficient hardware memory or virtual memory is available on a stack for executing function 205. Further, a stack overflow condition may occur as a result of infinite recursion or a deep level of method calls.

Reliability contract 210 is an annotation that is not executable, and therefore is not included in the composition of function 205. Rather, reliability contract 210 is associated with function 205 by being bundled or written into application 200, or at least function 205, either comprehensively or piecemeal throughout. Reliability contract 210 declares or expresses the intention of function 205 under the aforementioned particular conditions in a more succinct and straightforward manner than would be inferred by merely examining the code of function 205, and surmising the executability of function 205 under the particular conditions.

Thus, the author of application 200, or at least function 205, is able to declare or express an intent of function 205 in the face of particular conditions, such as a thread abort condition, out-of-memory condition, or stack overflow condition. That is, by being associated with reliability contract 210, function 205 carries with it a declaration of how it is likely to perform under particular circumstances, which may even be deemed exceptional since they are not expected during normal execution of function 205.

Accordingly, the association of reliability contract 210 with function 205 enables any device that is capable of parsing application 200, or at least function 205, to more effectively facilitate introspection of the corresponding code. Reliability contract 210 may play a role in an off-line testing environment to determine the reliability of application 200, or at least function 205, in the role of either a calling method or a called method. Alternatively, reliability contract 210 may play a role as a benign marker, upon which executable decisions are made with regard to particular conditions as application 200, or at least function 205, is executed.

Example embodiments of reliability contract 210 follow.

The following is an example of reliability contract 210 by which the author of application 200, or at least function 205 (entitled, in this example, "transferMoney"), indicates that function 205 may potentially corrupt all state (e.g., both state held within this instance of an object and potentially all other state held by this process), when faced with the aforementioned particular conditions (e.g., thread abort, out-of-memory, and stack overflow).

```
[ReliabilityContract(Consistency.MayCorruptProcess)]
public void transferMoney(Acct toAcct, Acct fromAcct, double amount)
{
    try
    {
        fromAcct.debit(amount);
    }
    catch (AcctException)
    {
        throw TransferException("Unable to debit fromAcct");
    }
    TranferAuditTrail.Record("Debit From Acct");
    try
    {
        toAcct.credit(amount);
    }
    Catch (AcctException)
    {
        fromAcct.credit(amount);
        throw TransferException("Unable to credit toAcct");
    }
}
```

By the preceding example, the author of the function transferMoney provides a guarantee that transferMoney may corrupt state in the face of particular conditions, as declared by the statement "[ReliabilityContract(Consistency.MayCorruptProcess)]." For example, there may be particular failure points that could be injected by the runtime environment of transferMoney from the call to "fromAcct.debit(amount)" to the call to "toAcct.credit(amount)," thereby leaving the accounts in an inconsistent state. The author of transferMoney has chosen to not address the execution of transferMoney in the face of the particular conditions, but has rather chosen to declare no guarantee of state consistency should the particular conditions arise.

By the next example of reliability contract 210, the author of application 200, or at least function 205 (entitled, in this example, "insertItem"), indicates that function 205 may potentially corrupt the instance state when faced with the aforementioned particular conditions (e.g., thread abort, out-of-memory, and stack overflow).

```
[ReliabilityContract(Consistency.CorruptInstance)]
public void insertItem(object item)
{
    try
    {
        moveIn(item);
        _itemCount = _itemCount+1;
        rebalance( );
    }
    catch (ThreadAbortException)
    {
        // don't know state of collection - caller should toss me
        throw;
    }
}
```

By the preceding example, the author of the function insertItem is unable to provide a reliability guarantee for the instance state during execution of the function insertItem, as declared by the statement "[ReliabilityContract(Consistency.CorruptInstance)]." For example, by the above code, a thread abort condition may arise after the statement "_itemCount=_itemCount+1" is executed, but prior to the value being stored back into "_itemCount." Therefore, the author has chosen to declare no guarantee of instance state reliability should the particular conditions arise.

By the next example of reliability contract 210, the author of application 200, or at least function 205 (entitled, in this example, "createAndAddAcct"), provides a reliability guarantee indicating that function 205 will not corrupt state but may potentially fail when faced with the aforementioned particular conditions (e.g., thread abort, out-of-memory, and stack overflow).

```
[ReliabilityContract(Consistency.WillNotCorruptState)]

public void createAndAddAcct(string name,double openingBalance)
{
    Acct a = null;
    ReliableTryMarker( );
    try
    {
        a = new Acct(name, openingBalance);
        collection.Add(a);
    }
    catch (OutOfMemoryException)
    {
        // OK to fail because of OOM
    }
    catch (ThreadAbortException)
    {
        OK to fail because of T.A( )
    }
    finally
    {
        // here we is how me make the guarantee - we'll do the cleanup,
        // and leave things consistent
        if (a != null)
        {
            // attempt to remove newly added acct
            collection.remove(a);
        }
    }
}
```

By the preceding example, the author of createAndAddAcct has taken steps to ensure that the function maintains a consistent state in the face of the aforementioned particular conditions, as declared by the statement "[ReliabilityContract(Consistency.WillNotCorruptState)]." For example, by the statement "// OK to fail because of OOM," the author of createAndAddAcct has provided a reliability guarantee that, even though the function may fail due to an out-of-memory (OOM) condition, state may be maintained. Similarly, the statement "OK to fail because of T.A( )" indicates that state may be maintained in the face of a thread abort condition. Therefore, the author has chosen to declare a guarantee of state reliability, via the reliability contract, should the particular conditions arise.

By the next example of reliability contract 210, the author of application 200, or at least function 205 (entitled, in this example, "removeAt"), provides a reliability guarantee indicating that function 205 will not corrupt state and will always succeed when faced with the aforementioned particular conditions (e.g., thread abort, out-of-memory, and stack overflow).

```
[ReliabilityContract(Consistency.WillNotCorruptState,
                     EXECUTION.Success)]

public void removeAt(int index)
{
    if (index < 0)
```

```
-continued

[ReliabilityContract(Consistency.WillNotCorruptState,
                     EXECUTION.Success)]

throw ArgumentOutOfRangeException("Bad one", "index");
    ReliableTryMarker( );
    try
    {
    }
    catch (Exception)
    {
    }
    finally
    {
        _size--;
        if (index < _size)
        {
            copy(_items, index+1, _items, index, _size-index);
        }
        _items[_size] = null;
    }
}
```

By the preceding example, the author of removeAt has taken steps to ensure that the function maintains a consistent state in the face of the aforementioned particular conditions, as declared by the statement "[ReliabilityContract(Consistency.WillNotCorruptState, Execution.Success)]." More particularly, the author is providing a reliability guarantee that the function will always succeed in spite of failures due to e.g., a stack overflow condition or thread abort condition occurring within this method. By the statement "ReliableTryMarker( )," which prompts the runtime environment to eagerly prepare the catch and finally regions of the function and, thereby, delay a thread abort condition to catch & finally regions. Therefore, the author has chosen to declare a guarantee of state reliability and successful execution should the particular conditions arise.

In the preceding examples, the enumeration "Consistency" has used by the author of application 200, or at least function 205, to parameterize reliability contract 210. However, such enumeration is by way of example only, and is not intended (nor should it be construed) to be limiting. Further example parameterizations of reliability contract 210 include:

Consistency.MayCorruptProcess

Consistency.MayCorruptAppDomain

Consistency.MayCorruptInstance

Consistency.WillNotCorruptState.

More particularly, the parameter "Consistency.MayCorruptProcess" indicates that no guarantees are provided regarding state consistency. That is, the associated function may corrupt the process in the face of any of the aforementioned particular conditions (e.g., thread abort condition, out-of-memory condition, or stack overflow condition).

The parameter "Consistency.MayCorruptAppDomain" indicates that no guarantees are provided regarding state consistency in a current application domain. An application domain is a unit of isolation within a process to run code, potentially with multiple threads, which enables the termination of a thread that is running a method that may potentially corrupt all state and further enables all affected pieces of state to be unloaded without corrupting any other state in the process. Thus, the parameter "Consistency.MayCorruptAppDomain" declares that the associated function may corrupt the current application domain in the face of any of the aforementioned particular conditions (e.g., thread abort condition, out-of-memory condition, or stack overflow condition). Any state corruption will be localized to the current application domain, allowing a host to unload and/or recycle the code within the application domain.

The parameter "Consistency.MayCorruptInstance" declares that, in the face of any of the aforementioned particular conditions (e.g., thread abort condition, out-of-memory condition, or stack overflow condition), any state corruption will be localized to this particular instance of an object.

The parameter "Consistency.WillNotCorruptState" declares that, in the face of any of the aforementioned particular conditions (e.g., thread abort condition, out-of-memory condition, or stack overflow condition), there will be no state corruption. It is noted that such guarantee is not a guarantee against function failure. Rather, the guarantee is a statement that none of the aforementioned particular conditions will corrupt state in the function.

Figure 3:
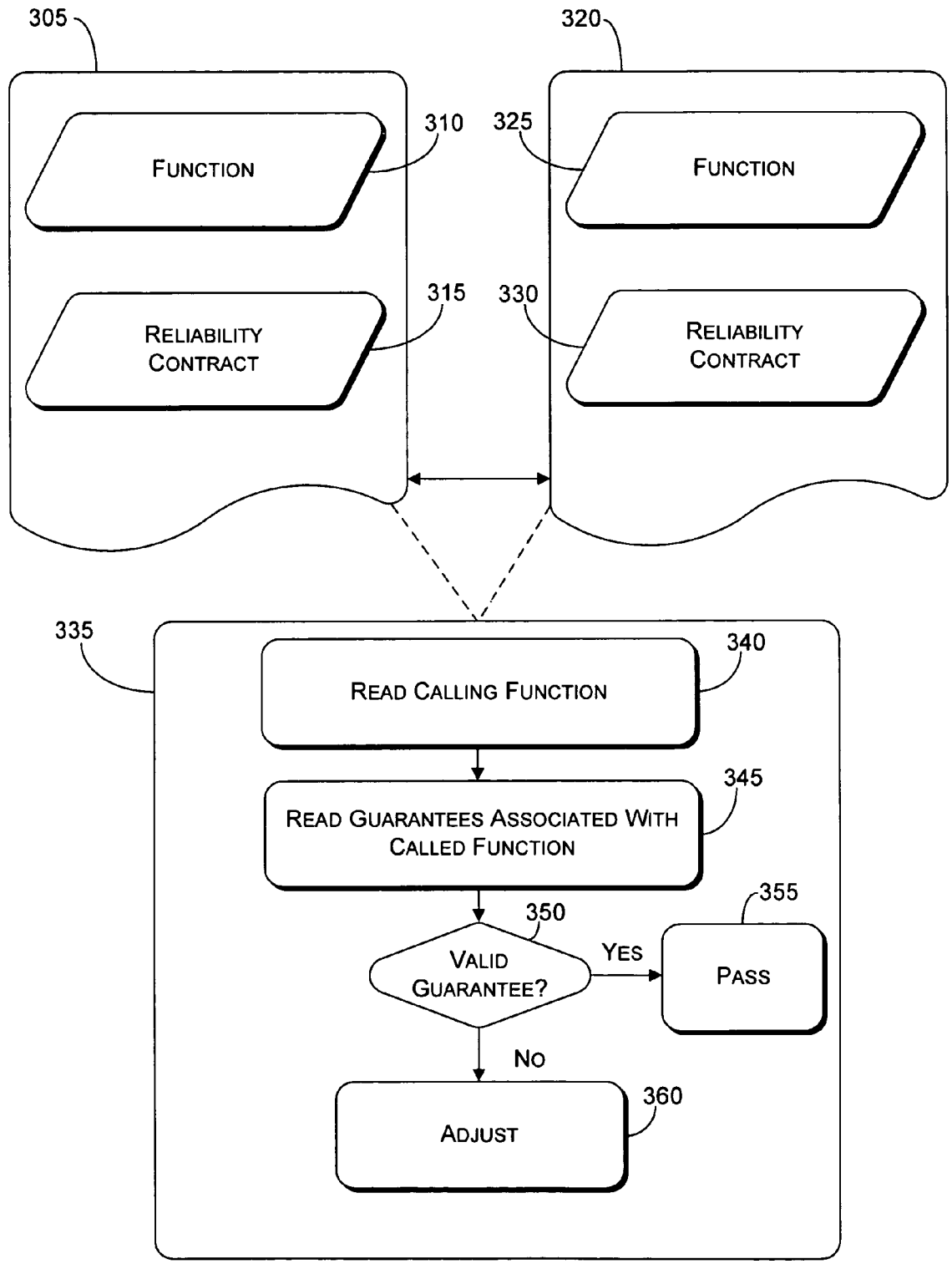
FIG. 3 shows a module and document processing according to an example embodiment.

FIG. 3 shows an example embodiment of module 335, which may be either a software- or a hardware-implemented module. The processing corresponding to module 335 is described to illustrate sample utilities for a reliability contract.

Module 335 may be any device that is capable of parsing any portion of an application, program, or function in accordance with various aspects of reliability contract implementation. Thus, relative to the example processing environment of FIG. 1, module 335 may be either of client device 105 or server device 110.

Alternatively, module 335 may be any software-enabled computing or processing device that is capable of analyzing the executable instructions corresponding to an application, program, or function, in either a runtime environment or a testing environment. Thus, relative to the example processing environment of FIG. 1, module 335 may also be "other" device 115. Further, module 335 may be on-line or off-line relative to client device 105 and server device 110. More particularly, module 335 may be any computing or processing device having an interpreter, converter, compiler, operating system, Java® Virtual Machine (JVM), or Common Language Runtime (CLR), implemented thereon. Further still, module 335 may be a stand-alone software validation tool utilized to inspect and analyze the executable instructions corresponding to an application, program, or function, in accordance with various aspect of reliability contract implementation. In particular, a stand-alone module 335 may be utilized to inspect a reliability contract and the underlying logic corresponding thereto. These examples of module 335 are not intended to be limiting in any way, and should not be construed in that manner.

For the purposes of describing the present embodiment, applications 305 and 320 refer to any application, program, set of instructions, method, function, or executable code capable of being executed or inspected at module 335. Further, in the context of the example embodiment, application 305 is a calling application and application 320 is a called application. That is, application 305 requests services from application 320. The call from application 305 is made to application 320 by a branch instruction or some other linking method that is created by an assembler, compiler or interpreter. Application 320 is responsible for returning control to the application 305 after application 320 has finished processing. In addition, applications 305 and 320 may originate from a common device or from separate devices. Further still, applications 305 may correspond to a same software program or separate software program.

In the further context of the present embodiment, a reliability contract is provided to declare or express a reliability guarantee between application 320 and its calling application 305. Therefore, other embodiments may contemplate only called application 320 having a reliability contract associated therewith.

Function 310 and function 325 refer to any executable portion of application 305 and application 320, respectively. Therefore, functions 310 and 325 may be any one of an application, program, set of instructions, method, function, or executable code that make up application 305 and application 320, respectively, in part or in their entirety.

Reliability contract 315 and reliability contract 330 are a form of meta data that declare or express the intent of functions 305 and 320, respectively, with regard to possible state corruption in the face of exceptional conditions that are not typically expected during normal execution of the application or function. As stated above, the exceptional conditions may include, but are in no way intended to be limited to, a thread abort condition, an out-of-memory condition, or a stack overflow condition.

In the present example, module 335 may receive application 305 and application 320 in either of a runtime environment or a testing environment. The processing described herein begins at block 340. More particularly, at block 340, module 335 reads at least calling function 310, which calls at least function 325.

At block 345, module 335 reads the guarantee in reliability contract 330 that is associated with called function 325. By inspecting the code for called function 325, module 335 is able to determine the validity of the guarantee in reliability contract 330 by inspecting the code of function 325 to verify that the code is written to be executed as guaranteed in reliability contract 330.

In alternative embodiments, in which module 335 reads reliability contract 315 associated with calling function 310 and reliability contract 330 associated with called function 325, module 335 is able to determine the validity of reliability contract 330 by inspecting the code of function 325 to verify that the code is written to be executed as guaranteed in reliability contract 330. Further, module 335 determines whether reliability contract 330 is at least as strict as reliability contract 315. Alternatively, module 335 is able to determine the validity of reliability contract 315 by checking whether calling function 310 is able to compensate for any failures anticipated in view of the lack of guarantees associated with called function 325.

In a runtime environment, if the guarantee in reliability contract 330 is determined to be valid at decision marker 350, block 355 indicates a pass whereby execution control is returned to calling function 310. In alternative embodiments, the determined validity of reliability contract 330 may serve as a catalyst for runtime decisions to be made by calling function 310.

In a testing environment, if the guarantee in reliability contract 330 is determined to be valid at decision marker 350, block 355 indicates a pass whereby no corresponding adjustments are required for either calling function 310 or called function 320.

In a runtime environment, if the guarantee in reliability contract 330 is determined to not be valid at decision marker 350, block 360 indicates a call for adjustments. That is, calling function 310 is notified that execution adjustments by function 310 may be required to compensate for an actual or anticipated failure in the execution of called function 325.

In a testing environment, if the guarantee in reliability contract 330 is determined to not be valid at decision marker 350, block 360 indicates a call for adjustments. That is, calling function 310 is notified that inspections and, most likely, revisions to the code of calling function 310 may be required to compensate for an anticipated failure in the execution of called function 325.

Accordingly, reliability contracts are able to provide a high level of introspection into the capabilities and intent of called and calling functions that may not otherwise be apparent by merely inspecting the code.

Figure 4:
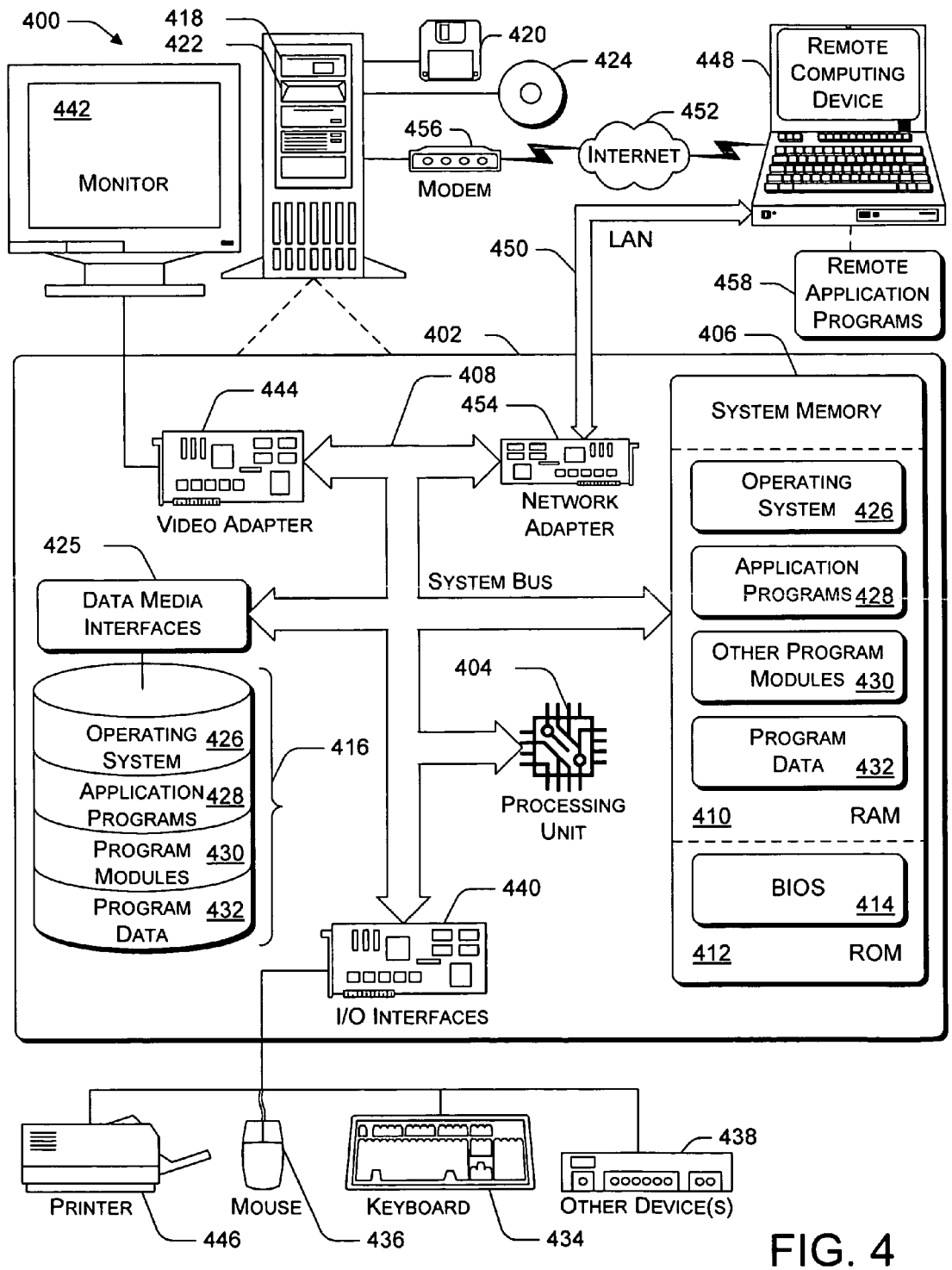
FIG. 4 illustrates a general computer network environment which can be used to implement the techniques described herein.

FIG. 4 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402, which may be any one of client device 105, server device 110, or "other" device 115 (see FIG. 1). The components of computer 402 can include, but are not limited to, one or more processors or processing units 404, system memory 406, and system bus 408 that couples various system components including processor 404 to system memory 406.

System bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 402 may include a variety of computer-readable media. Such media can be any available media that is accessible by computer 402 and includes both volatile and non-volatile media, removable and non-removable media.

System memory 406 includes computer-readable media in the form of volatile memory, such as random access memory (RAM) 410; and/or non-volatile memory, such as read only memory (ROM) 412 or flash RAM. Basic input/output system (BIOS) 414, containing the basic routines that help to transfer information between elements within computer 402, such as during start-up, is stored in ROM 412 or flash RAM. RAM 410 typically contains data and/or program modules that are immediately accessible to and/or presently operated on by processing unit 404.

Computer 402 may also include other removable/non-removable, volatile/non-volatile computer storage media. By way of example, FIG. 4 illustrates hard disk drive 416 for reading from and writing to a non-removable, non-volatile magnetic media (not shown), magnetic disk drive 418 for reading from and writing to removable, non-volatile magnetic disk 420 (e.g., a "floppy disk"), and optical disk drive 422 for reading from and/or writing to a removable, non-volatile optical disk 424 such as a CD-ROM, DVD-ROM, or other optical media. Hard disk drive 416, magnetic disk drive 418, and optical disk drive 422 are each connected to system bus 408 by one or more data media interfaces 425. Alternatively, hard disk drive 416, magnetic disk drive 418, and optical disk drive 422 can be connected to the system bus 408 by one or more interfaces (not shown).

The disk drives and their associated computer-readable media provide non-volatile storage of computer-readable instructions, data structures, program modules, and other data for computer 402. Although the example illustrates a hard disk 416, removable magnetic disk 420, and removable optical disk 424, it is appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 416, magnetic disk 420, optical disk 424, ROM 412, and/or RAM 410, including by way of example, operating system 426, one or more application programs 428, other program modules 430, and program data 432. Each of such operating system 426, one or more application programs 428, other program modules 430 and program data 432 (or some combination thereof) may implement all or part of the resident components that support the distributed file system.

A user can enter commands and information into computer 402 via input devices such as keyboard 434 and a pointing device 436 (e.g., a "mouse"). Other input devices 438 (not shown specifically) may include a microphone, joystick, game pad, satellite dish, serial port, scanner, and/or the like. These and other input devices are connected to processing unit 404 via input/output interfaces 440 that are coupled to system bus 408, but may be connected by other interface and bus structures, such as a parallel port, game port, or a universal serial bus (USB).

Monitor 442 or other type of display device can also be connected to the system bus 408 via an interface, such as video adapter 444. In addition to monitor 442, other output peripheral devices can include components such as speakers (not shown) and printer 446 which can be connected to computer 402 via I/O interfaces 440.

Computer 402 can operate in a networked environment using logical connections to one or more remote computers, such as remote computing device 448. By way of example, remote computing device 448 can be a PC, portable computer, a server, a router, a network computer, a peer device or other common network node, and the like. Remote computing device 448 is illustrated as a portable computer that can include many or all of the elements and features described herein relative to computer 402. Alternatively, computer 402 can operate in a non-networked environment as well.

Logical connections between computer 402 and remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, computer 402 is connected to local network 450 via network interface or adapter 454. When implemented in a WAN networking environment, computer 402 typically includes modem 456 or other means for establishing communications over wide network 452. Modem 456, which can be internal or external to computer 402, can be connected to system bus 408 via I/O interfaces 440 or other appropriate mechanisms. It is to be appreciated that the illustrated network connections are examples and that other means of establishing at least one communication link between computers 402 and 448 can be employed.

In a networked environment, such as that illustrated with computing environment 400, program modules depicted relative to computer 402, or portions thereof, may be stored in a remote memory storage device. By way of example, remote application programs 458 reside on a memory device of remote computer 448. For purposes of illustration, applications or programs and other executable program components such as the operating system are illustrated herein as discrete blocks, although it is recognized that such programs and components reside at various times in different storage components of computing device 402, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer-readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A computer storage medium having data structure thereon, the data structure, when executed by a computer causes the computer to;
    enable executable code; and
    generating a reliability contract that expresses an intent with regard to potential state corruption of at least a portion of the executable code, and
    associating the reliability contract with the at least a portion of the executable code via a non-executable code annotation, and
    providing for introspection of the associated portion of executable code to be facilitated without execution of the associated portion of executable code.

2. A computer storage medium according to claim 1, wherein the reliability contract declares reliability guarantees for a performance of the associated portion of the executable code with regard to particular conditions.

3. A computer storage medium according to claim 2, wherein the particular conditions include a thread abort condition.

4. A computer storage medium according to claim 2, wherein the particular conditions include an out-of-memory condition.

5. A computer storage medium according to claim 2, wherein the particular conditions include a stack overflow condition.

6. A computer storage medium according to claim 1, wherein the reliability contract is bundled with the associated portion of executable code.

7. A computer storage medium according to claim 1, wherein the reliability contract is bundled piecemeal throughout the associated portion of executable code.

8. A computer storage medium according to claim 1, wherein the reliability contract is a marker for decisions for execution of the associated portion of executable code with regard to particular conditions.

* * * * *